United States Patent [19]
Korn

[11] Patent Number: 4,553,449
[45] Date of Patent: Nov. 19, 1985

[54] APPARATUS FOR ACTIVATING A BOWDEN CABLE

[75] Inventor: Heinrich Korn, Gersthofen, Fed. Rep. of Germany

[73] Assignee: Röder GmbH, Sitzmöbelwerke, Fed. Rep. of Germany

[21] Appl. No.: 536,326

[22] Filed: Sep. 27, 1983

[30] Foreign Application Priority Data

Oct. 5, 1982 [DE] Fed. Rep. of Germany ... 8227885[U]

[51] Int. Cl.⁴ .............................................. F16C 1/10
[52] U.S. Cl. .................................................. 74/501 R
[58] Field of Search ............................. 74/501 R, 108

[56] References Cited

FOREIGN PATENT DOCUMENTS 2836730 3/1979 Fed. Rep. of Germany .... 74/501 R

Primary Examiner—Kenneth J. Dorner
Attorney, Agent, or Firm—Wigman & Cohen

[57] ABSTRACT

An apparatus for activating a Bowden cable comprising a double-armed activating member which is mounted in a can-like insert body. The activating member has one arm for manually activating the cable and a second arm which pivotally connects the activating member to the insert body and also has a hook for engagement with the Bowden cable.

18 Claims, 6 Drawing Figures

APPARATUS FOR ACTIVATING A BOWDEN CABLE

BACKGROUND OF THE INVENTION

In a known apparatus for activating a Bowden cable, a double-armed activating lever is mounted in a bracket, which can be attached to a pipe or the like. The known device requires a relatively high installation expense.

SUMMARY AND OBJECTS OF THE INVENTION

The basic object of the present invention is to make the apparatus usable in a plate-like body, particularly in a seat plate of a chair. A can-like body is inserted into a plate-like body and is integrated therein. The resulting apparatus has a pleasing shape, and is easy to service, because it can be activated like a pushbutton.

The present invention also achieves a savings of space. The arm which acts on the cable, when in its rest position, does not project beyond the contour of the insert body. In the activated position, only this arm projects beyond the contour of the insert body.

The present invention also provides a favorable arrangement for mounting the activating lever on the insert body. There is also an apparatus for attaching the device to a support plate. There is also taught a guiding of the cable in the insert body.

The invention is further characterized by its simple construction, which has a relatively small number of structural elements. The activating lever of the present invention can be set in a predetermined position, and the latch member can be secured in each of its two end positions and can be secured against falling out of place in the activating member. Further advantages will be evident from the description and the drawings.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

In the drawings, an apparatus for activating a Bowden cable which can be built into the seat plate of a chair is schematically illustrated as an exemplary embodiment of the object of the invention. Shown are.

DETAILED DESCRIPTION OF A PREFERRED EMBODIMENT

Figure 1:
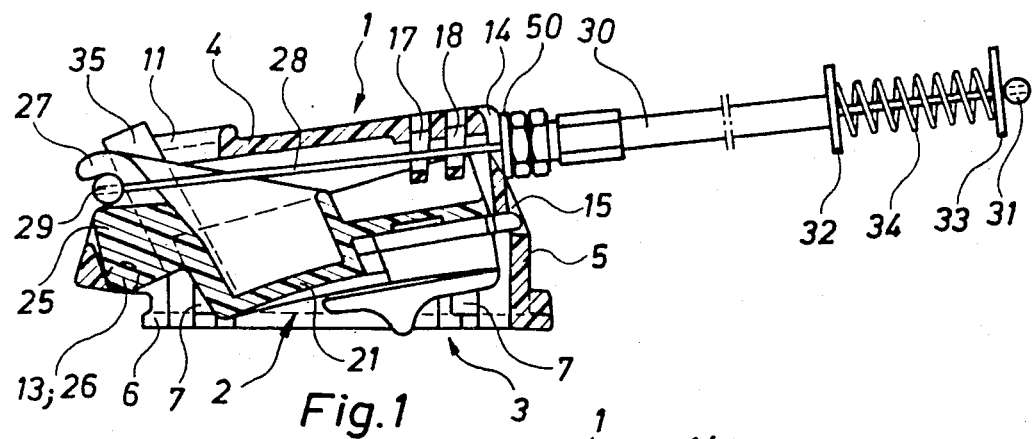
FIG. 1 is an axial section.

A double-armed activating member 2 is pivotably mounted on a can-like insert body 1, which activating member 2 can be secured in the position shown in FIG. 1 by means of a latch member 3. The insert body 1, the activating member 2 and the latch member 3 each consist of an injectable or castable plastic.

Figure 2:
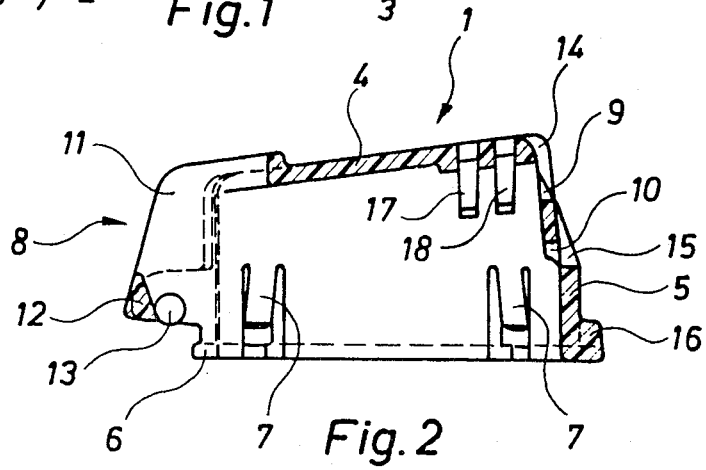
FIGS. 2 and 4 are similar cross sections of individual elements.
Figure 3:
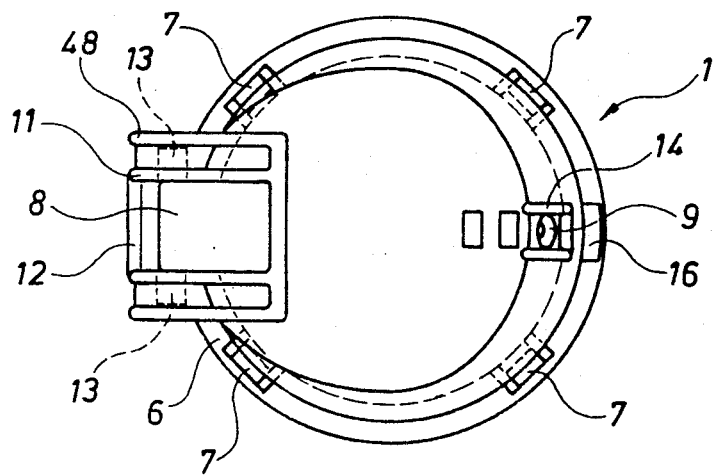
FIGS. 3 and 5 are top views of the individual elements in FIGS. 2 and 4.

The insert body 1 (FIG. 2) has a floor 4, a wall 5 surrounding the floor and a reinforced edge 6. Four detent members 7, which are evenly distributed about the periphery and are arranged at a distance from the edge 6, are cut out of the wall 5 and serve, together with the edge 6 to detent and hold the body in position in a seat plate of a chair. Openings 8 through 10 are provided at opposing positions in the wall 5, whereby the openings 9 and 10, which are arranged on the same side, lie opposite the opening 8. The opening 8 extends over the entire height of the wall and also extends into the floor 4. It is surrounded by an outwardly projecting edge 11, which expands, wedge-like, from the floor 4 to the edge 6. The outer ends of the edge 11 have a connecting bar 12 in the vicinity of the edge 6, next to connecting bar 12. Open mounting bores 13 are provided in the edge 11 running toward the edge 6 to mount the activating member 2. These mounting bores 13 lie outside of the wall 5. An identical edge portion 48 spaced outside of the opening 8 is associated with the portion of the edge 11 located next to the wall 5 (FIG. 3).

The bores 9 and 10 on the side of the insert body 1 opposite the opening 8 are provided with fewer formed edges 14 and 15 laterally to the wall 5 than the edge 11. The edges 14 and 15 are arranged one above the other. The floor 4 is arranged so as to be inclined relative to the edge 6, whereby on the side of the opening 8 the distance between the floor 4 and the edge 6 is smaller than it is on the opposite side. Beneath the opening 10 the edge 6 has an axis-parallel projection 16, which serves to secure the position of the insert body in the seat plate. Inwardly projecting grommets 17 and 18 are arranged on the floor 4. In the vicinity of the edge 6 the wall 5 has a cylindrical shape and in the vicinity of the floor 4 it has a conical shape, whereby the cone axis is arranged at an angle to the axis of the cylindrical portion of the wall 5, namely in such a manner that on the side of the opening 8 the cylindrical wall portion is higher than it is on the opposite side.

Figure 4:
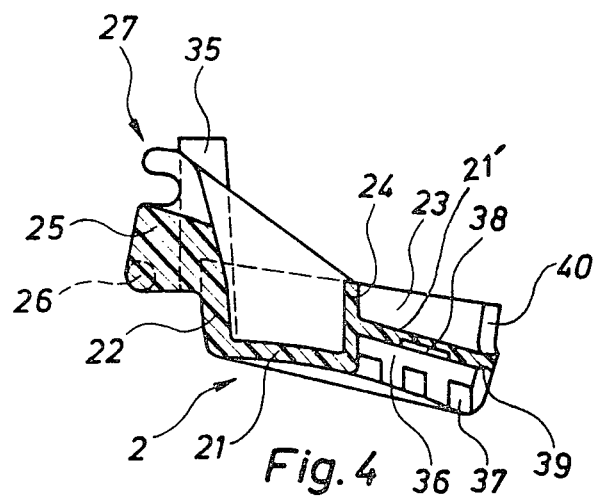
Figure 5:
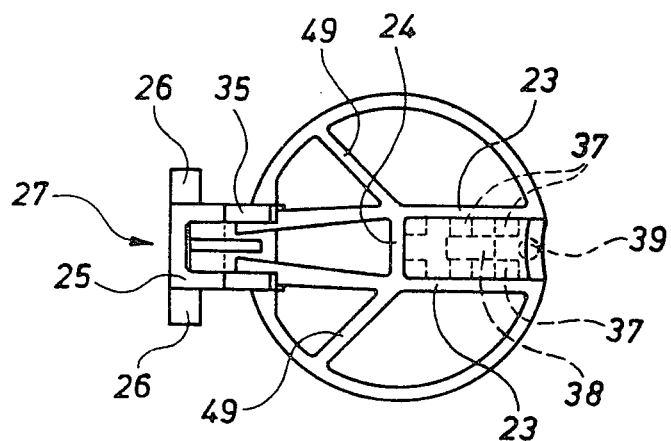

The activating member 2 illustrated in FIGS. 4 and 5 has a can-like portion having a floor 21 which serves as an activating arm and has a slightly conically shaped wall 22, which widens somewhat toward the open side. Inside the sleeve-like portion are arranged two parallel cross walls 23, which are connected with each other by a connecting wall 24 arranged approximately in the center thereof.

Shown at the left in the drawing is a pulling arm 25 next to the wall 22, which pulling arm 25 has mounting pins 26 arranged on both sides which, in turn, can be placed in the mounting bores 13 in the insert body 1 from the edge 6 in the manner of a detent connection. The pulling arm 25 projects radially outward and is connected with the cross walls 23 for reinforcement purposes. A hook 27 is arranged above the pulling arm 25 to receive an end member 29 arranged on the cable 28 of a Bowden cable (FIG. 1). The cable passes through the insert body 1 in the vicinity of the floor 4 and passes through the grommets 17, 18 as well as the opening 9. The tube 30 containing the cable is supported on the edges which surround the opening 9 on both sides, by means of a washer and an adjusting nut which can be secured in its position by a lock nut. A compression spring 34 is supported between the tube 30 and an end member 31 arranged on the other end of the cable by respective bored discs 32 and 33. Compression spring 34 biases the floor 21 of the activating member 2 outward and tends to rotate the hook 27 into the interior of the insert body (1). If the apparatus is used to activate an activating member of a gas spring, then the elements 32 through 34 can be eliminated. The end of the tube 30 closest to the end member 31 is supported on a holding body connected with the piston rod of the gas spring, on which holding body a lever is mounted next to the activating member for the gas spring. The end member 31 acts on this lever.

A stop member 35 is provided on the activating member 2 next to the hook 27, which stop member 35 cooperates with the portion of the edge 11 of the opening 8 located at the floor 4 as a counterstop, whereby the activating member 2 is prevented from pivoting too far outward.

On the side of the activating member 2 opposite the pulling arm 25 is an opening 36 to receive the latch member 3. The opening 36 is open on the side of the actuating member 2 opposite the pulling arm 25 and the cross wall 23. There are guide blocks 37 in the vicinity of the floor 21, which project inwardly and maintain free spaces between themselves. Three such guide blocks 37, appropriately spaced from each other, are provided on each side. An opening 38, which is approximately rectangular when viewed from below, is provided in the portion of the floor bordering the opening 36 on the inside of the activating member 2 and a detent opening 39 is provided on the side opposite the pulling arm 25. A slot 40 is arranged in the cover 22 above the detent opening 39 to allow passage of the cable 28 when the activating member 2 is pivoted completely into the insert body 1.

Figure 6:
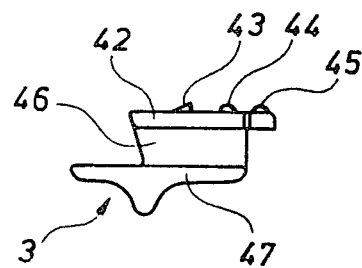
FIG. 6 is an individual element shown in the same view as in FIG. 1.

The latch member 3 illustrated in FIG. 6 has a bar element 42, which is slidably disposed in the activating member 2 between the guide blocks 37 and the inwardly displaced portion 21' of the floor 21 (FIG. 1). The bar element 42 has a securing projection 43, which when seen from the side has a wedge shape and, as shown in FIG. 6, is flat toward the left side and falls away toward the right side. The inclined portion cooperates with a wall of the opening 38 to prevent the latch member 3 from disengaging from the activating member 2. In addition, two spaced detent projections 44 and 45 are provided on bar element 42 on the same side as the securing projection 43. One of the projections 44, 45 always cooperates with the detent opening 39 of the activating member 2 to secure the then current position of the latch member 3 in the activating member 2.

When the latch member 3 is in the position illustrated in FIG. 1, the detent projection 44 engages in the detent opening 39, and the latch is in its closed position. In that position, a portion of bar 42 extends beyond the activating member 2 and projects into the bore 10 in the insert body 1. In the other position of the latch member 3, the detent projection 45 engages in the detent opening 39. In this position the latch element 42 only projects far enough beyond the activating member 2 to allow the activating member 2 to be pivoted outward by the effect of the compression spring 34. The latch element 42, however, in this position still projects sufficiently far forward to abut the edge of the opening 10 adjacent the floor 4, so that the activating member 2 cannot be pivoted too far into the insert body 1.

A connecting element 46 is provided on the side of the latch element 42 opposite the projections 43 through 45. The connecting element 46 extends between the guide blocks 37 of the activating member 2 and connects the latch element 42 with an exterior activating element 47. Exterior activating element 47 permits activation of device by facilitating the sliding of the latch member 3 within opening 36 by hand to thus release the latch member 3 from opening 10 and allowing the activating member 2 to pivot within the insert body 1. The latch element 42 is somewhat wider than the connecting element 46. The activating element 47 is significantly wider than the connecting element 46 and has a cross rib which facilitates activation of the latch member.

The apparatus according to the invention forms a structural unit having relatively few components, which can be used in a plate without additional attachment means.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. An apparatus for activating a Bowden cable, comprising:
   a double-armed activating member; an insert body;
   mounting element means arranged on the insert body for pivotally mounting the activating member to the insert body; and
   latch means slidably mounted on the activating member, said latch means being slidable from a first position wherein the activating member can pivot within the insert body to a second position wherein the latch means engages with the insert body to prevent the activating member from pivoting therein;
   said activating member, comprising:
   an activating arm; and
   a pulling arm which includes a means for engaging the Bowden cable.

2. The apparatus according to claim 1, wherein the activating arm of the activating member is formed in the shape of a can-like body, which engages in the insert body and is pivotable therein.

3. The apparatus according to claim 1, wherein the pulling arm of the activating member projects into a recess formed in a wall and floor on one side of the insert body, said recess being surrounded by a reinforcing edge.

4. The apparatus according to claim 2, wherein the pulling arm of the activating member projects into a recess formed in a wall and floor on one side of the insert body, said recess being surrounded by a reinforcing edge.

5. The apparatus according to claim 3, wherein the reinforcing edge has a fixed mounting element located outside of the wall on the side of the insert body opposite the floor, said apparatus further including a recess, also having a reinforcing edge, on the opposite side of the insert body to allow passage of the cable of the Bowden cable.

6. The apparatus according to claim 1, wherein the insert body has a peripheral wall, detent members being provided in the wall of the insert body to engage in a plate-like body.

7. The apparatus according to claim 1, wherein a grommet is arranged inside the insert body on a floor thereof and projects into a hollow chamber, which is provided to guide the cable.

8. The apparatus according to claim 1, wherein a stop member, which cooperates with the insert body, is provided on the pulling arm of the activating member.

9. The apparatus according to claim 1, wherein the latch means has detent members, each of which can cooperate with a complementary detent element arranged on the activating member.

10. The apparatus according to claim 1, wherein the latch means has a stop member which secures it from falling out of the activating member and makes its insertion into the activating member possible, and which cooperates with a stop member of the activating member.

11. The apparatus according to claim 9, wherein the latch means has a stop member which secures it from falling out of the activating member and makes its insertion into the activating member possible, and which cooperates with a stop member of the activating member.

12. The apparatus according to claim 1, wherein the latch means is disposed within an opening in the activating member opposite the pulling arm.

13. The apparatus according to claim 12, further comprising means within the opening for guiding the latch means.

14. The apparatus according to claim 1, wherein the pulling arm and activating arm form an obtuse angle.

15. An apparatus for activating a Bowden cable, comprising:
- a double-armed activating member including an activating arm and a pulling arm which includes means for engaging the Bowden cable;
- an insert body;
- mounting means arranged on the insert body for pivotally mounting the activating member to the insert body; and
- latch means mounted on the activating member, said latch means having a first position wherein the activating member can pivot within the insert body and a second position wherein the latch means engages with the insert body to prevent the activating member from pivoting therein.

16. The apparatus according to claim 15, wherein the activating arm of the activating member is formed in the shape of a can-like body, which engages in the insert body and is pivotable therein.

17. The apparatus accoridng to claim 15, wherein the latch means has detent members, each of which can cooperate with a complementary detent element arranged on the activating member.

18. The apparatus according to claim 15, wherein the latch means has a stop member which secures it from falling out of the activating member and makes its insertion into the activating member possible, and which cooperates with a stop member of the activating member.

* * * * *